Dec. 4, 1956  W. R. COYNE  2,772,643
METHOD AND APPARATUS FOR PRODUCING DOUGHNUT
DOUGH FORMATIONS HAVING SCALLOPED INNER
AND OUTER PERIPHERAL SURFACES
Filed Aug. 18, 1951
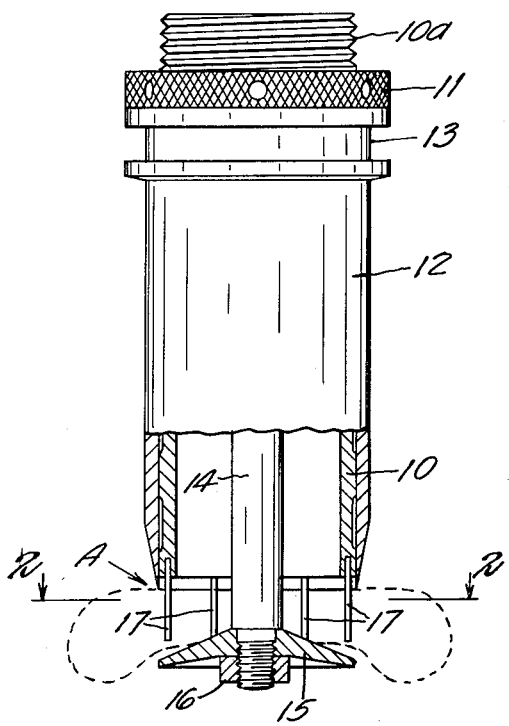
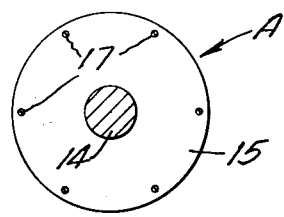
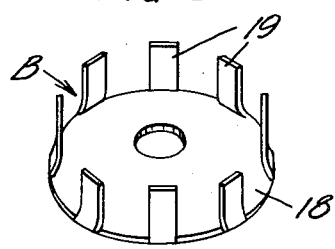
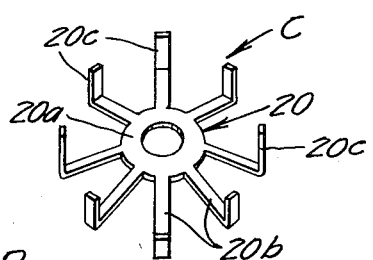
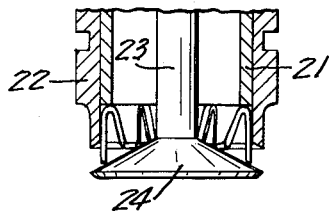
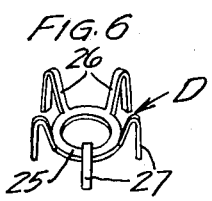
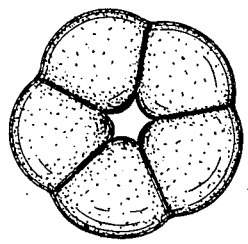
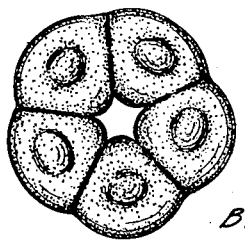
INVENTOR
William R. Coyne
BY Williamson & Williamson
ATTORNEYS United States Patent Office 2,772,643
Patented Dec. 4, 1956

1

2,772,643

METHOD AND APPARATUS FOR PRODUCING DOUGHNUT DOUGH FORMATIONS HAVING SCALLOPED INNER AND OUTER PERIPHERAL SURFACES

William R. Coyne, Minneapolis, Minn., assignor to Pillsbury Mills, Inc., Minneapolis, Minn., a corporation of Delaware Application August 18, 1951, Serial No. 242,474

7 Claims. (Cl. 107—14)

This invention relates to a method and apparatus for producing improved dough products such as doughnuts and the like.

My present invention, hereinafter disclosed and claimed, is related generally to my invention disclosed and claimed in U. S. Patent No. 2,635,560, issued April 21, 1953, and entitled "Doughnut Cutter," the application for which was co-pending herewith.

While I was able to produce good results with the method and apparatus disclosed in my above identified patent, my present invention, herein disclosed, has produced greatly improved results by providing even more surface area with which the hot frying grease is permitted to come into contact. By increasing the surface area of the dough shape being fried, the frying time can be reduced and obviously more of the tasty outer brown crust will also be produced in addition to producing a product which has a neat, novel and attractive appearance.

In conventional dough cutting devices for doughnuts such as the device described in my above identified patent, the dough is extruded through a confined annular opening and periodically cut off to drop into the deep fat disposed therebelow. The central hole forming member is actually much larger in diameter than the ultimate hole of the doughnut since the dough flows together considerably after being extruded and cut off through the annular opening. It is this flowing together of the dough which is important to the successful operation of my present invention.

In my previous invention, I produced a number of radial cuts extending outwardly only a relatively short distance from the inner periphery of the doughnut. However, in my present invention, I completely sever the dough in a generally radial direction as it is being extruded through the generally annular opening and thus produce a plurality of separate segments. These separate extruded segments are intermittently cut off and, largely due to the natural cohesive quality and the flowing property of the dough, the central portions of adjacent segments flow together upon being cut off and form an interconnected generally annular mass having a segmental wavy scalloped outer as well as inner periphery. This interconnected mass then drops into the hot frying grease where it is cooked in the conventional manner. For any particular dough consistency, the area of contact between adjacent segments depends in inverse relation upon the width of the cuts made in the annular dough shapes as they are extruded and cut off, and a dough product having a plurality of cross sectional depressions to provide easily separable segments will thus be produced. Obviously, the deeper the depressions formed between the adjacent segments, the greater the area of contact with the frying fat and the more thoroughly the dough is cooked for any given frying time.

It is an object of my present invention to provide a novel and highly efficient method and apparatus for producing a new and greatly improved generally annular scalloped dough product.

It is an additional object to provide dough formations of generally annular shape having cross sectional depressions formed therein to produce a scalloped product with easily separable segments which may be divided along the cross sectional cleavage planes defined by said depressions.

It is another object to provide apparatus particularly adapted to carry out my new method of manufacturing doughnuts and constructed as an attachment for an extrusion type of doughnut forming machine whereby the extruded dough will be completely severed generally radially thereof to produce a plurality of separate and individual radially disposed ribbons until cut off, at which time the central portions of adjacent segments flow together and respectively adhere one to the other to form an interconnected annular member having a segmental wavy and scalloped outer as well as inner periphery which is dropped into the hot frying fat disposed therebelow.

It is a further object to provide four separate and distinct forms of my present apparatus, all adapted to produce completely severed segments of dough in annular arrangement as the dough is extruded through the restricted annular opening of an extrusion type doughnut forming device, said four forms of my invention respectively producing cuts of various widths, to vary the depths of the depressions of the scalloped product by thus varying the area of contact between the adjacent segments of the product.

These and other objects and advantages of my invention will more fully appear from the following description made in connection with the accompanying drawing wherein like reference characters refer to the same or similar parts throughout the several views and in which:

Fig. 1 is a front elevational view partially in vertical section, showing an extrusion type cutter head or spout adapted to be connected with a pressurized hopper such as the one shown in my previously identified patent.

Fig. 2 is a horizontal sectional view taken substantially along the line 2—2 of Fig. 1;

Fig. 3 is a top perspective view of an alternative form of dough cutting die adapted to be attached to the cutter head shown in Fig. 1;

Fig. 4 is a perspective view of still another form of cutting die;

Fig. 5 is a fragmentary vertical sectional view showing a slightly modified form of cutter head of materially reduced size with still another alternative form of dough forming die;

Fig. 6 is a top perspective view of the die shown in Fig. 5;

Fig. 7 is a top plan view of a doughnut formed with the die shown in Fig. 6; and Fig. 8 is a bottom plan view thereof.

As best shown in Fig. 1, a conventional type extrusion head assembly is illustrated. This assembly consists in a depending cylindrical spout or head member 10 adapted to be secured at the bottom of a pressurized hopper (not shown) as by the threaded portion 10a at the upper end thereof. A knurled internally threaded member 11 is threadably received on said threaded portion and a sliding lever actuated cutter sleeve 12 is slidably mounted on the outside of said cylinder 10 for vertical reciprocation thereon. The upper portion of said outer sleeve is grooved at 13 to receive a forked actuating lever (not shown) for reciprocating said sleeve 12 on said cylinder. A depending spindle 14 is securely fixed within the spout 10 as by a spider (not shown). A central hole forming or island member 15 is secured at the bottom of spindle 14 as by the nut 16 and is disposed in spaced relation below the lower end of head member or spout 10 and is of substantially the same outside diameter as the outside diameter of said spout, thus forming an annular passage below said spout through which the dough is extruded. The upper surface of the hole forming member or island member is beveled downwardly from the inner portion toward the outer periphery thereof, as best shown in Fig. 1, and, in the form shown, the bottom surface thereof is concavely dished. The cutoff sleeve 12 is periodically reciprocated to intermittently cut off the dough extruded through said annular opening and the outside diameter of the island member 15 is substantially equal to the inside diameter of said cutoff sleeve 12.

In the form of my invention illustrated in Figs. 1 and 2 and designated by the letter A, I provide a plurality of circumferentially spaced depending dough severing slit forming fingers or severing elements 17 respectively mounted at their upper ends in the lower end portions of the spout or head member 10. It will be noted that these fingers or severing elements 17 extend downwardly nearly the entire distance across the opening formed between the lower end of the spout or head member 10 and the top surface of the island or hole forming member 15 so that the dough extruded through said opening is completely severed radially forming a plurality of separate and individual segments arranged generally annularly, which segments are cut off by reciprocation of the cutoff sleeve 12 as has been previously described. When these individual segments are cut off they flow together to form an interconnected mass which is discharged from the periphery of the island member 15 and drops into the deep frying fat disposed in a large vat (not shown) positioned therebelow. As the dough falls into the vat it has an inherent tendency to spread out and portions of the interconnected segments continuue to flow together. Obviously, the width of the depending fingers or severing elements can be varied to control the width of the cuts radially formed through the dough as it is extruded through the opening above said island member 15.

In form B of my invention illustrated in the perspective view designated as Fig. 3 of the drawing, instead of the depending severing elements 17 fixed at the bottom of the spout or cylindrical head 10, I provide a substitute island member 18 having a plurality of circumferentially spaced upstanding cutoff elements or fingers 19. The operation of form B of my invention is substantially similar to the operation of form A thereof and similar results are obtained therewith. The substitute island member 18 replaces the conventional island member 15 and the upstanding severing elements 19 are fixed around the periphery of said substitute island member 18 and are offset inwardly to provide clearance between the outer surfaces thereof and the reciprocating cutoff sleeve 12. The upper surface of island member 18 is of course beveled downwardly from the center thereof to the outer edge portion in a manner similar to that described for the top surface of the conventional island member 15. The width of the fingers 19 is, in the form shown, illustrated as being considerably wider than the depending elements 17; however, this of course is merely a matter of choice in producing the desired dough shape to be ultimately formed, the wider the blades or severing members for any particular dough consistency the deeper the indentations that are formed in the ultimate product and the less the area of contact which will be produced between adjacent segments to hold said segments in interconnected relation.

In Fig. 4 of the drawing, a third form of my invention is illustrated, designated by the letter C, which consists in a spider-like member adapted to be mounted on the top surface of the conventional island member 15. The spider member 20 has a central annular body portion 20a with a plurality of circumferentially spaced radially disposed blade mounting elements 20b, each having an upstanding finger 20c fixed at the outer end thereof. These upstanding fingers 20c are disposed when mounted on the top surface of island member 15, a slight distance inwardly from the outer periphery of said island member in order to provide clearance for free reciprocation for cutoff sleeve 12. The lower surface defined by the blade mounting members 20b is concavely beveled to position the annular body portion 20a adjacent the top of conventional island member 15 and rest thereon.

Another form of dough severing device designated by the letter D is illustrated in Figs. 5 and 6. Fig. 5 illustrates a different type of dough extruding device and shows another conventional type of machine. The device illustrated is of considerably smaller size than the device illustrated in Fig. 1 and has an inner cylindrical spout or head member 21 with an outer cutoff sleeve 22 slidably mounted thereon. A depending spindle 23 is mounted at the top of the spout or head member 21 by any suitable means (not shown) and is removable therefrom. The central hole forming or island member 24 is fixed rigidly to the bottom of said spindle 23 and the outer diameter thereof is slightly larger than the inside diameter of the cutoff sleeve 22 so that reciprocation of said cutoff sleeve 22 will produce intermittent engagement of the lower edge thereof with the outer top marginal edge surface of the island member 24. The lower end of the cutoff sleeve 22 is beveled inwardly to receive the island therein. Obviously, any dough cutting die mounted on the top of island member 24 must be inserted over the top end of upstanding spindle 23 and dropped down onto the top surface of island member 24. The top of the spindle 23 is of somewhat larger diameter than the lower end thereof and therefore the central annular member 25 of cutting die D must have an inner diameter large enough to pass over the upper end of spindle 23 and will be somewhat larger than the lower end of said spindle, as best shown in Fig. 5.

The cutting die D having the central annular member 25 has a plurality of circumferentially spaced upstanding dough severing elements or fingers 26 which, in the form shown, diverge outwardly toward the top and each of said fingers 26 has a depending positioning and stabilizing element 27 fixed thereto. Said positioning and stabilizing elements 27 engage the inner lower portion of the reciprocating outer sleeve 22 or the cylindrical discharge head 21 to hold the die D in predetermined centrally positioned relation relative to said cylindrical spout. The lower surface of the central annular member 25 of course engages the top surface of island member 24.

As the dough is extruded through the annular opening formed between the lower end of spout 21 and top surface of island member 24, the upstanding dough severing elements 26 will of course divide the extruded dough radially into a plurality of individual ribbons which will flow together when they are cut off by the reciprocated outer cutoff sleeve 22. The doughnuts shown in Figs. 7 and 8 were produced by the apparatus shown in Figs. 5 and 6 and are of considerably smaller size than those produced by the apparatus shown in Figs. 1 through 4, inclusive. However, the general shape thereof is similar to that produced by form C of my invention; form B having the wide fingers 19 would produce deeper indentations and form A having the narrow severing elements or fingers 17 would produce considerably shallower indentations. It should be noted that the generally annular shaped dough formations shown in Figs. 7 and 8 have scalloped inner and outer peripheries with definite radially disposed cleavage planes formed between adjacent joined dough segments. The radial indentations formed between adjacent segments lie generally in these cleavage planes and extend inwardly from the top and bottom of the segments as well as from the outer edge and outwardly from the inner periphery, thus materially increasing the area of contact between the dough surface and the frying fat in which the dough formations are cooked and producing a materially increased browned, crusted area, thus materially reducing the time required for completely cooking the doughnuts and producing a doughnut which will remain fresh for materially increased periods of time.

It will be seen that I have provided novel and highly efficient apparatus for producing new dough formations of generally annular shape having scalloped peripheries and cross sectionally disposed cleavage depressions providing definite cleavage planes along which the segments defined thereby are easily separable. The four forms of my invention disclosed herein are all adapted to cooperate with conventional dough extrusion devices for producing generally annular shapes and, when combined therewith, form a scalloped product having easily separable segments with radially disposed, definite and distinct cleavage planes formed between adjacent segments.

It will, of course, be understood that various changes may be made in the form, details, arrangement and proportions of the parts without departing from the scope of my invention.

What I claim is:

1. The method of producing generally annular dough formations consisting in forming a generally annular dough shape while simultaneously dividing without lateral confinement said dough shape into a plurality of substantially radially separated individual segments and permitting portions of adjacent segments to flow together to interconnect the same and form a generally annular mass having scalloped inner and outer peripheries, the inherent nature of the dough causing portions of adjacent segments to flow together after formation of said individual segments to form said interconnected annular mass.

2. The method of producing generally annular dough formations consisting in forming a generally annular dough shape while simultaneously radially severing without lateral confinement said annular shape into a multiplicity of divided entirely separate individual segments disposed in generally annular arrangement, permitting portion of adjacent segments to flow together to interconnect the same and form a generally annular mass having scalloped inner and outer peripheries, and introducing said annular mass into hot frying fat, the inherent nature of the dough causing portions of adjacent segments to flow and adhere together after formation of said individual segments to form said interconnected annular mass.

3. The method of producing generally annular doughnut dough formations consisting in extruding dough through a generally annular opening, completely severing the dough during extrusion thereof through said opening into an unconfined area to form a plurality of separate individual dough ribbons and intermittently cutting off said ribbons to produce a plurality of generally annularly arranged interconnected segments, discharging said interconnected segments into hot frying fat, the inherent nature of the dough causing portions of adjacent segments to flow together when cut off for discharge into the hot frying fat to form an interconnected annular dough product having a scalloped inner and outer periphery.

4. Apparatus for producing generally annular dough formations having scalloped inner and outer peripheries, said apparatus comprising a generally upright hollow cylindrical extrusion spout, a centrally disposed hole-forming island member mounted in spaced relation below the lower end of said spout a sufficient distance to produce a peripheral extrusion opening at the bottom of the spout member of sufficient depth to form a generally annular dough formation when extruded therethrough, a cutoff sleeve slidably mounted on said spout and closing said opening by engagement with said island member when disposed in downwardly projected position, a plurality of peripherally spaced dough severing fingers extending between the top surface of said island member and the lower end of said spout and traversing substantially the entire distance therebetween to sever into a plurality of annularly arranged separate individual segments when dough is extruded through the peripheral opening between the spout and island member when said cutoff sleeve is in raised position, the severing fingers being only of sufficient width and depth with respect to the thickness of the extruded dough segments to permit said segments to subsequently flow together when cut off by downward projection of said cutoff sleeve to close said opening.

5. The structure set forth in claim 4, and said fingers being formed as an integral part of the dough-severing die member mounted above said hole-forming island member.

6. The structure set forth in claim 5, and each of said dough-severing fingers of said die being inclined upwardly and outwardly from said island member to engage the lower end of said spout member and having a substantially vertically disposed centering and stabilizing element fixed in depending relation to the upper portion thereof.

7. The structure set forth in claim 4, and said fingers being mounted in fixed depending relation in the lower portion of said spout and extending downwardly nearly the entire distance to the hole-forming island.

References Cited in the file of this patent

UNITED STATES PATENTS

| | | |
|---|---|---|
| D. 96,223 | Brennan | July 16, 1935 |
| 554,273 | Hueg | Feb. 11, 1896 |
| 794,287 | Faust | July 11, 1905 |
| 1,621,454 | Bleier | Mar. 15, 1927 |
| 2,092,160 | Hawerlander | Sept. 7, 1937 |
| 2,126,416 | Schlichter | Aug. 9, 1938 |
| 2,262,485 | Belshaw | Nov. 11, 1941 |
| 2,429,042 | Bader | Oct. 14, 1947 |
| 2,463,112 | Kipnis | Mar. 1, 1949 |
| 2,643,620 | Miller | June 30, 1953 |